May 16, 1967 R. S. PAULIUKONIS ET AL 3,319,433
RECTANGULAR DEWAR
Filed May 24, 1966 2 Sheets-Sheet 1
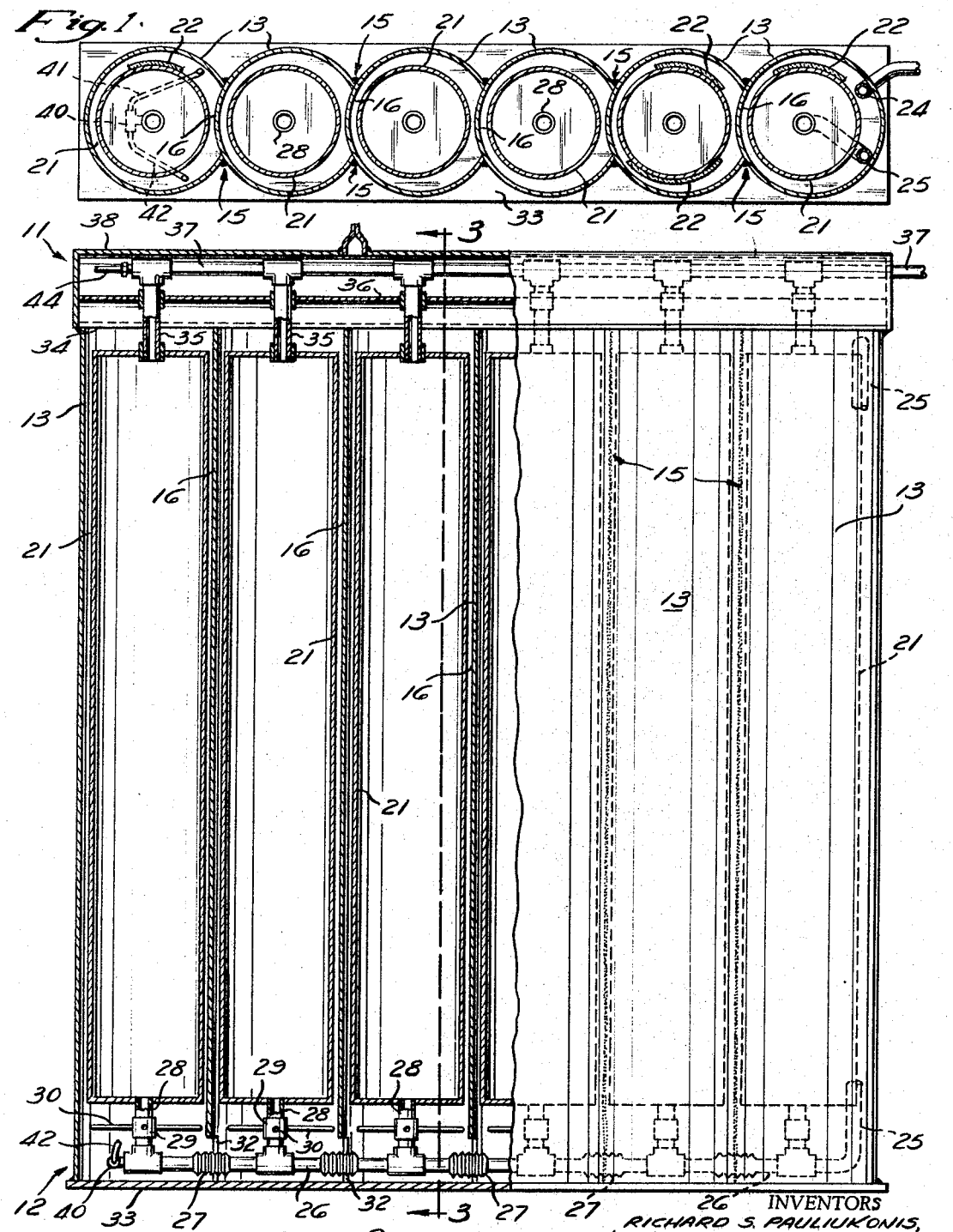
INVENTORS
RICHARD S. PAULIUKONIS,
& GEORGE MATLOW
BY
ATTORNEYS

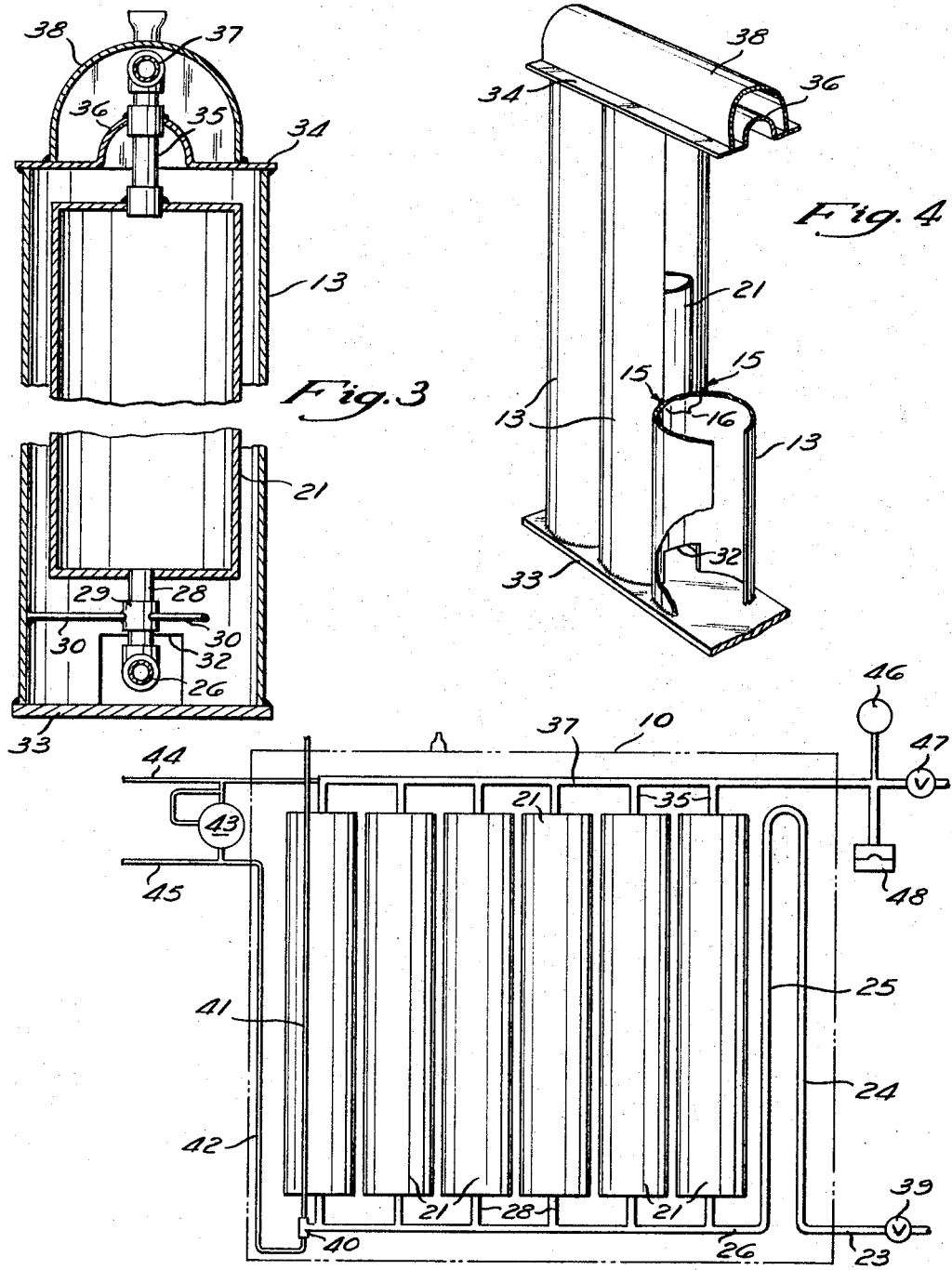

United States Patent Office 3,319,433
Patented May 16, 1967

3,319,433
RECTANGULAR DEWAR
Richard S. Pauliukonis and George Matlow, Cleveland, Ohio, assignors to Ryan Industries, Inc., Cleveland, Ohio, a corporation of Ohio
Filed May 24, 1966, Ser. No. 552,576
9 Claims. (Cl. 62—45)

This invention relates to apparatus for storing liquefied gases and more particularly to a "rectangular" Dewar, that is, a Dewar whose shape is box-like rather than being spherical or cylindrical. As used herein the term "Dewar" applies to double-walled thermally insulated vessels where the space between the walls is evacuated. Such evacuated space is usually wholly or partly filled with multilayer insulation or powder or other means to achieve better thermal insulation than that accomplished by vacuum alone.

When a Dewar is to be located in a rectangular cargo compartment, it is desirable that the Dewar also be rectangular so as not to waste cargo space. The same may be true for any application where a Dewar is to be located in a box-like space.

Evacuated pressure vessels such as Dewars must withstand external atmospheric pressures up to about 15 p.s.i. Rectangular pressure vessels are commonly fabricated with flat walls. Even at a low pressure such as that of the atmosphere, the non-supported flat surfaces may distort unless the vessel is made with walls thick enough to insure adequate structural rigidity. Such walls, however, are normally so thick and heavy that they can't be used in containers of moderate capacity, such as those employed for transport refrigeration systems, because the containers become too heavy and costly. Therefore it is common to increase the strength of flat panels in evacuated vessels by using stiffeners such as ribs, corrugated shapes, structural shapes, or other similar structural supports which may be fixed to the flat panels or formed in the flat panels. This method avoids greatly increasing panel weight, but only at the cost of the additional space necessary to accommodate stiffener members. The weight advantage is offset by the cost in space. Other expedients have been tried such as load-supporting pegs or the support of panels by thermal insulation filler but these have not proved to be fully satisfactory from a standpoint of fabrication cost and from a standpoint of all-around practicality for some applications.

A principal object of the present invention is to provide an improved rectangular Dewar. Another object of the invention is to provide a rectangular Dewar that exploits some of the advantageous features of cylindrical pressure vessels. Another object of the invention is to provide a Dewar that utilizes continuations of the surfaces of configuration of the outer vessel or shell to accomplish internal cross-bracing and thus support the outer vessel or shell against atmospheric pressure loads in a simple manner that does not require elaborate fabricating operations.

Another object of the invention is to provide a rectangular Dewar having a self-supporting outer shell or jacket but having low space and weight requirements for a given storage capacity. Another object of the invention is to provide improved arrangements of fluid conduits between the exterior and interior of the Dewar to minimize heat flow along the conduits or avoid the use of relatively expensive low heat-conductive metals. In one aspect, these arrangements allow certain valves to be replaced without first emptying the Dewar as is usually required, particularly for bottom-fill Dewars.

The following description of an embodiment of the invention is given by way of example and not by way of limitation. In the accompanying drawings, FIGURE 1 is a plan view in section of a rectangular Dewar contemplated by the present invention. FIGURE 2 is a side elevation partly broken away of the Dewar of FIGURE 1. FIGURE 3 is a section taken on the plane of line 3—3 in FIGURE 2. FIGURE 4 is an isometric view of certain structural components of the Dewar. FIGURE 5 is a schematic diagram of fluid circuits associated with the illustrated Dewar.

The jacket or outer shell or vessel of the illustrated Dewar constitutes a vacuum envelope that encloses an evacuated zone. The vacuum envelope is indicated schematically by the reference numeral 10 in FIGURE 5. In its physical form this envelope comprises top and bottom closure means indicated generally by reference numerals 11 and 12, and a number of generally parallel intersecting cylinders 13 extending between the top and bottom closure means 11 and 12.

According to the invention, cross-bracing is accomplished by utilizing portions of the cylinder walls, and no additional supports or stiffeners are required. The series of cylinders 13 form a serial array in which each adjacent pair of outer cylinders 13 is joined along two longitudinal seams or joints 15 with the wall of one member of the pair annularly interrupted between the seams and the wall of the other member of the pair continuing annularly between the seams. This provides an interior cross-bracing wall portion 16. Neither of the faces of this wall portion is exposed to the exterior of the jacket or outer shell 10 (FIGURE 5) formed by the exteriors of the cylinders 13 together with the top and bottom closure means 11 and 12.

The Dewar is provided with inner shell means comprising an array of inner cylinders 21 that are separate from each other and do not intersect. Each inner cylinder 21 is positioned within and generally parallel to an outer cylinder 13. The top and bottom ends of the inner cylinders are closed for containment of fluid contents. The separate inner cylinders or vessels 21 are insulated individually, preferably by wrapped multilayer insulation 22, fragments of which are illustrated only in FIGURE 1.

Fabricating costs of this structure are moderate compared to those of other interiorly cross-braced structures, and the material for the cross-bracing is provided by the walls of the cylinders 13 without any requirement for specially fabricated cross-braces.

The inner cylinders 21 may be slightly offset from coaxial relationship with the outer cylinders 13 to provide space for vertically extending conduits that may be located within the vacuum space without interfering with the insulation 22. Thus the feed line 23 may be provided with vertical reaches 24 and 25 that lead to a bottom manifold 26. Flexible transition pieces 27 (FIGURE 2) are included between each pair of inner cylinders 21 to provide expansion joints in the manifold 26. The manifold 26 is connected to the bottom of each inner cylinder 21 through a depending connecting conduit 28. These are surrounded by sleeves 29. Bottom support rods 30 extend from the sleeves 29 radially to the side of the cylinders 13. These rods are preferably fabricated from known materials that combine adequate structural strength with low thermal conductivity such as the alloy "Hastelloy B" or titanium or equivalent. Openings 32 are provided in the interior wall portions 16 at the bottom end thereof (FIGURES 3, 4) and the bottom manifold 26 extends through these openings.

In the illustrated embodiment, the bottom closure 12 comprises a single bottom plate 33 to which the lower ends of the cylinders 13 are seal welded around the perimeter of the envelope formed by the array of cylinders 13. This is done after placing appropriate insulation into the bottom void space within the array of cylinders 13 but below the inner cylinders 21.

In the illustrated embodiment the top closure means 11 includes a top cover plate 34 which is flat at least at its outboard sections that are laterally outside the upper ends of the interior cross-bracing wall portions 16. It is provided with openings for simultaneous insertion of neck tubes 35 from which the inner cylinders 21 depend. These openings may be formed in a raised portion 36 of the top cover plate to provide in effect an inverted channel or beam to better support the weight of the inner cylinders 21 and liquid carried therein. Prior to positioning of the top cover plate, appropriate insulation may be placed in the top void space over the heads of the inner cylinders 21 and around each neck tube 35. The top plate 34 is seal welded around the upper end of the perimeter formed by the array of cylinders 13, and its raised portion 36 is seal welded to the neck tubes 35. Each of the neck tubes 35 is connected to a top manifold 37 which may be covered by a guard plate or shell 38. This may simply open to atmosphere or its ends may be sealed and it may form part of the evacuated space of the dewar.

The vertical extents 24 and 25 of the fill line 23 provide a loop for containment of the liquid within the conduit and offer an extremely long heat path to minimize heat leak into the contents via the fill conduit. The conduit may therefore be fabricated from ordinary tubing or, if the cost of special low-conductive materials is justified, the heat loss of the fill line may be reduced to an extremely low value. If it becomes necessary to replace the fill valve 39, the Dewar need only be vented to relieve the pressure, if any. If need not be emptied since the high vertical loop retains the liquid contents even when the inner cylinders 21 are filled to capacity with liquid.

At the other end of the bottom manifold a T 40 connects to a liquid withdrawal conduit 41 and a liquid leg conduit 42. A liquid line 45 for a liquid level gage (not shown) leads from the line 42 and a gas line 44 leads from the manifold 37. A pressure building regulator 43 is provided in the circuit, utilizing the legs of the liquid level gage to act as an emergency pressure building means if and when system pressure drops below a predetermined level.

The upper manifold may be provided with an appropriate pressure relief valve 46, vent valve 47, and safety bursting disc 48.

The outer cylinders 13 are arranged in series and therefore constitute a serial array. As seen most clearly in FIGURE 1, the array is moniliform and the cylinders 13 are crowded in on each other so that the length of the serial array is less than the sum of the diameters of the cylinders in the array. Each cylinder 13 except the one at the right end (as viewed in FIGURE 1) has a portion 16 removed along its length to allow its neighbor that is nearer the right end to crowd in. Each cylinder 13 except the one at the left end of the array crowds in on its neighbor that is nearest to the left end.

The invention is not restricted to the slavish imitation of each and every one of the details described above which have been set forth merely by way of example with the intent of most clearly setting forth the teaching of the invention. Obviously devices may be provided which change, eliminate or add certain specific structural details without departing from the invention.

What is claimed is:

1. A Dewar including outer shell means comprising top and bottom closure means and a serial array of two or more outer generally parallel intersecting cylinders extending between said top and bottom closure means, each adjacent pair of outer cylinders in the array being joined along two longitudinal seams with the wall of one member of the pair being annularly interrupted between the seams and the wall of the other member of the pair continuing annularly between the seams to provide an interior cross-bracing wall portion neither of whose faces is exposed to the exterior of the outer shell means, inner shell means comprising an array of non-intersecting inner closed-end cylinders within the outer cylinders, and fluid line means communicating between the exterior of the Dewar and the interiors of the inner cylinders.

2. A Dewar as in claim 1 in which the interiors of said outer cylinders are joined to provide a single chamber for evacuation.

3. A Dewar as in claim 2 in which the interiors of said outer cylinders are joined through one or more openings through said interior wall portion(s).

4. A Dewar as in claim 3 in which the manifolding means extends through said one or more openings.

5. A Dewar as in claim 1, said top and bottom closure means including flat wall portions abutted by the ends of said outer cylinders at least at the portions of the cylinder ends that are laterally outside the ends of the interior wall portions of the outer shell means.

6. A Dewar as in claim 1, said inner cylinders being slightly offset from coaxial relationship with the outer cylinders, said fluid line means including lines having long vertical portions extending between and along an inner and an outer cylinder at or near the region of greatest spacing therebetween.

7. A Dewar as in claim 6, two of said long vertical portions comprising parts of a fill line that runs from the exterior of the vessel in to one vertical portion that is joined at the top to the second vertical portion that is joined at the bottom to a bottom manifold connected to the inner cylinders.

8. A Dewar as in claim 1, one of said outer cylinders that is at an end of the annular array having a wall that is not interrupted annularly, and the wall of each remaining outer cylinder having one annular interruption.

9. A Dewar including an outer vessel comprising a moniliform serial crowded array of generally parallel outer cylinders, each cylinder except one at one end of the array having a portion removed along its length to allow its neighbor that is nearer to said one end to crowd in, each cylinder except the one at the other end of the array crowding in on its neighbor that is nearest to said other end, means closing the tops and bottoms of said outer cylinders to render the outer vessel gastight, a plurality of inner closed cylinders each within one of the outer cylinders and generally parallel therewith, and fluid line means between the exterior of the Dewar and the interior of the inner cylinders.

References Cited by the Examiner

UNITED STATES PATENTS

| | | | |
|---|---|---|---|
| 1,897,165 | 2/1933 | Eudacott et al. | 62—55 |
| 2,106,496 | 1/1938 | Debor | 220—1 |
| 2,920,784 | 1/1960 | Boardman | 220—1 |
| 2,975,927 | 3/1961 | Arne | 220—1 |
| 3,104,758 | 9/1963 | Allen et al. | 220—23.2 |
| 3,159,004 | 12/1964 | Keith | 62—45 |

LLOYD L. KING, *Primary Examiner.*